(12) United States Patent
Johnson et al.

(10) Patent No.: US 8,842,454 B2
(45) Date of Patent: Sep. 23, 2014

(54) INVERTER ARRAY WITH LOCALIZED INVERTER CONTROL

(75) Inventors: Brian Johnson, Champaign, IL (US);
Philip Krein, Champaign, IL (US);
Alexander Gray, Champaign, IL (US);
Patrick L. Chapman, Austin, TX (US)

(73) Assignee: SolarBridge Technologies, Inc., Austin, TX (US)

( * ) Notice: Subject to any disclaimer, the term of this patent is extended or adjusted under 35 U.S.C. 154(b) by 425 days.

(21) Appl. No.: 13/030,118

(22) Filed: Feb. 17, 2011

(65) Prior Publication Data

US 2012/0134186 A1     May 31, 2012

Related U.S. Application Data

(60) Provisional application No. 61/417,453, filed on Nov. 29, 2010.

(51) Int. Cl.
| | |
|---|---|
| *H02M 7/48* | (2006.01) |
| *H02M 7/49* | (2007.01) |
| *H02M 1/00* | (2006.01) |
| *H02J 3/38* | (2006.01) |
| *H02M 3/158* | (2006.01) |

(52) U.S. Cl.
CPC ............ *H02M 7/49* (2013.01); *Y02E 10/563* (2013.01); *H02M 2001/007* (2013.01); *Y02E 10/58* (2013.01); *H02J 3/383* (2013.01); *H02J 3/385* (2013.01); *Y02B 70/1466* (2013.01); *H02M 3/1588* (2013.01)
USPC ............................................. 363/71; 363/95

(58) Field of Classification Search
USPC ................. 323/906; 363/71, 72, 95, 98, 132
See application file for complete search history.

(56) References Cited

U.S. PATENT DOCUMENTS

| | | |
|---|---|---|
| 3,670,230 A | 6/1972 | Rooney et al. |
| 4,114,048 A | 9/1978 | Hull |
| 4,217,633 A | 8/1980 | Evans |

(Continued)

FOREIGN PATENT DOCUMENTS

| | | |
|---|---|---|
| CA | 2353422 C | 3/2004 |
| CA | 2655007 A1 | 8/2010 |

(Continued)

OTHER PUBLICATIONS

Kutkut, "PV Energy Conversion and System Integration," Florida Energy Systems Consortium, 2009, 24 pages.

(Continued)

*Primary Examiner* — Jeffrey Sterrett
(74) *Attorney, Agent, or Firm* — Barnes & Thornburg LLP

(57) ABSTRACT

An apparatus for delivering AC power to an AC load may include a plurality of inverters to receive direct current (DC) power from a respective DC power source and respectively provide AC power to an AC load. The apparatus may further include a first controller to generate a first control signal based on total AC current and total AC voltage being delivered to the AC load by the plurality of inverters. The apparatus may further include a plurality of secondary controllers to each receive the first control signal and each produce a respective secondary control signal based on the first control signal. The respective secondary control signal for each of the plurality of secondary controllers is configured to control a corresponding one of the plurality of inverters to provide a portion of the AC power.

20 Claims, 12 Drawing Sheets

(56) References Cited

U.S. PATENT DOCUMENTS

| | | |
|---|---|---|
| 4,277,692 A | 7/1981 | Small |
| 4,287,465 A | 9/1981 | Godard et al. |
| 4,651,265 A | 3/1987 | Stacey et al. |
| 4,661,758 A | 4/1987 | Whittaker |
| 4,707,774 A | 11/1987 | Kajita |
| 4,709,318 A | 11/1987 | Gephart et al. |
| 4,719,550 A | 1/1988 | Powell et al. |
| 4,725,740 A | 2/1988 | Nakata |
| 4,994,953 A * | 2/1991 | Haak ................ 363/71 |
| 5,041,959 A | 8/1991 | Walker |
| 5,148,043 A | 9/1992 | Hirata et al. |
| 5,160,851 A | 11/1992 | McAndrews |
| 5,191,519 A | 3/1993 | Kawakami |
| 5,272,613 A | 12/1993 | Buthker |
| 5,309,073 A | 5/1994 | Kaneko et al. |
| 5,343,380 A | 8/1994 | Champlin |
| 5,473,528 A | 12/1995 | Hirata |
| 5,668,464 A | 9/1997 | Krein |
| 5,677,833 A * | 10/1997 | Bingley ............ 363/71 |
| 5,684,385 A | 11/1997 | Guyonneau et al. |
| 5,721,481 A | 2/1998 | Narita et al. |
| 5,745,356 A | 4/1998 | Tassitino |
| 5,796,182 A | 8/1998 | Martin |
| 5,801,519 A | 9/1998 | Midya et al. |
| 5,886,890 A | 3/1999 | Ishida et al. |
| 5,929,537 A | 7/1999 | Glennon |
| 5,978,236 A | 11/1999 | Faberman et al. |
| 5,982,645 A | 11/1999 | Levran et al. |
| 6,046,402 A | 4/2000 | More |
| 6,154,379 A | 11/2000 | Okita |
| 6,157,168 A | 12/2000 | Malik |
| 6,169,678 B1 * | 1/2001 | Kondo et al. ............ 363/71 |
| 6,180,868 B1 | 1/2001 | Yoshino et al. |
| 6,201,180 B1 | 3/2001 | Meyer et al. |
| 6,201,319 B1 | 3/2001 | Simonelli et al. |
| 6,222,745 B1 | 4/2001 | Amaro et al. |
| 6,225,708 B1 | 5/2001 | Furukawa |
| 6,259,017 B1 * | 7/2001 | Takehara et al. ........ 307/82 |
| 6,268,559 B1 | 7/2001 | Yamawaki |
| 6,285,572 B1 | 9/2001 | Onizuka et al. |
| 6,291,764 B1 | 9/2001 | Ishida et al. |
| 6,311,279 B1 | 10/2001 | Nguyen |
| 6,356,471 B1 | 3/2002 | Fang |
| 6,369,461 B1 | 4/2002 | Jungreis et al. |
| 6,381,157 B2 | 4/2002 | Jensen |
| 6,445,089 B1 | 9/2002 | Okui |
| 6,462,507 B2 | 10/2002 | Fisher |
| 6,489,755 B1 | 12/2002 | Boudreaux et al. |
| 6,563,234 B2 | 5/2003 | Hasegawa et al. |
| 6,605,881 B2 | 8/2003 | Takehara et al. |
| 6,614,132 B2 | 9/2003 | Hockney et al. |
| 6,624,533 B1 | 9/2003 | Swanson |
| 6,657,321 B2 | 12/2003 | Sinha |
| 6,700,802 B2 | 3/2004 | Ulinski et al. |
| 6,727,602 B2 | 4/2004 | Olson |
| 6,750,391 B2 | 6/2004 | Bower et al. |
| 6,765,315 B2 | 7/2004 | Hammerstrom |
| 6,770,984 B2 | 8/2004 | Pai |
| 6,795,322 B2 | 9/2004 | Aihara et al. |
| 6,838,611 B2 | 1/2005 | Kondo et al. |
| 6,847,196 B2 | 1/2005 | Garabandic |
| 6,881,509 B2 | 4/2005 | Jungreis |
| 6,882,063 B2 | 4/2005 | Droppo et al. |
| 6,950,323 B2 | 9/2005 | Achleitner |
| 6,954,366 B2 | 10/2005 | Lai et al. |
| 7,031,176 B2 | 4/2006 | Kotsopoulos et al. |
| 7,072,195 B2 | 7/2006 | Xu |
| 7,091,707 B2 | 8/2006 | Cutler |
| 7,193,872 B2 | 3/2007 | Siri |
| 7,233,130 B1 | 6/2007 | Kay |
| 7,289,341 B2 | 10/2007 | Hesterman |
| 7,319,313 B2 | 1/2008 | Dickerson et al. |
| 7,324,361 B2 | 1/2008 | Siri |
| 7,339,287 B2 | 3/2008 | Jepsen et al. |
| 7,365,998 B2 | 4/2008 | Kumar |
| 7,405,494 B2 | 7/2008 | Tassitino, Jr. et al. |
| 7,420,354 B2 | 9/2008 | Cutler |
| 7,432,691 B2 | 10/2008 | Cutler |
| 7,463,500 B2 | 12/2008 | West |
| 7,477,037 B2 * | 1/2009 | Amorino et al. ............ 318/803 |
| 7,502,697 B2 | 3/2009 | Holmquist et al. |
| 7,521,914 B2 | 4/2009 | Dickerson et al. |
| 7,531,993 B2 | 5/2009 | Udrea et al. |
| 7,551,460 B2 | 6/2009 | Lalithambika et al. |
| 7,577,005 B2 | 8/2009 | Angerer et al. |
| 7,592,789 B2 | 9/2009 | Jain |
| 7,609,040 B1 | 10/2009 | Jain |
| 7,626,834 B2 | 12/2009 | Chisenga et al. |
| 7,638,899 B2 | 12/2009 | Tracy et al. |
| 7,643,319 B2 | 1/2010 | Wagoner |
| 7,646,116 B2 | 1/2010 | Batarseh et al. |
| 7,660,139 B2 | 2/2010 | Garabandic |
| 7,667,610 B2 | 2/2010 | Thompson |
| 7,679,160 B2 | 3/2010 | Udrea et al. |
| 7,710,752 B2 * | 5/2010 | West ................ 363/71 |
| 7,733,679 B2 | 6/2010 | Luger et al. |
| 7,768,155 B2 | 8/2010 | Fornage |
| 7,796,412 B2 | 9/2010 | Fornage |
| RE41,965 E | 11/2010 | West |
| 7,839,022 B2 | 11/2010 | Wolfs |
| 7,855,906 B2 | 12/2010 | Klodowski et al. |
| RE42,039 E | 1/2011 | West et al. |
| 7,899,632 B2 | 3/2011 | Fornage et al. |
| 7,916,505 B2 | 3/2011 | Fornage |
| 8,053,783 B2 | 11/2011 | Amaratunda et al. |
| 8,223,515 B2 * | 7/2012 | Abolhassani et al. ........ 363/65 |
| 2001/0043050 A1 | 11/2001 | Fisher |
| 2002/0017822 A1 | 2/2002 | Umemura et al. |
| 2002/0196026 A1 | 12/2002 | Kimura et al. |
| 2003/0231517 A1 * | 12/2003 | Bixel ................ 363/71 |
| 2004/0208029 A1 * | 10/2004 | Caruthers et al. ........... 363/72 |
| 2005/0180181 A1 * | 8/2005 | Gaudreau et al. ........... 363/71 |
| 2005/0213272 A1 | 9/2005 | Kobayashi |
| 2006/0067137 A1 | 3/2006 | Udrea |
| 2006/0083039 A1 | 4/2006 | Oliveira |
| 2007/0035261 A1 | 2/2007 | Amorino et al. |
| 2007/0040539 A1 | 2/2007 | Cutler |
| 2007/0040540 A1 | 2/2007 | Cutler |
| 2007/0133241 A1 | 6/2007 | Mumtaz et al. |
| 2007/0221267 A1 | 9/2007 | Fornage |
| 2008/0055952 A1 | 3/2008 | Chisenga et al. |
| 2008/0078436 A1 | 4/2008 | Nachamkin et al. |
| 2008/0106921 A1 | 5/2008 | Dickerson et al. |
| 2008/0203397 A1 | 8/2008 | Amaratunga et al. |
| 2008/0266922 A1 | 10/2008 | Mumtaz et al. |
| 2008/0272279 A1 | 11/2008 | Thompson |
| 2008/0283118 A1 | 11/2008 | Rotzoll et al. |
| 2008/0285317 A1 | 11/2008 | Rotzoll |
| 2008/0304296 A1 | 12/2008 | NadimpalliRaju et al. |
| 2009/0000654 A1 | 1/2009 | Rotzoll et al. |
| 2009/0020151 A1 | 1/2009 | Fornage |
| 2009/0066357 A1 | 3/2009 | Fornage |
| 2009/0079383 A1 | 3/2009 | Fornage et al. |
| 2009/0080226 A1 | 3/2009 | Fornage |
| 2009/0084426 A1 | 4/2009 | Fornage et al. |
| 2009/0086514 A1 | 4/2009 | Fornage et al. |
| 2009/0097283 A1 | 4/2009 | Krein et al. |
| 2009/0147554 A1 | 6/2009 | Adest et al. |
| 2009/0184695 A1 | 7/2009 | Mocarski |
| 2009/0200994 A1 | 8/2009 | Fornage |
| 2009/0225574 A1 | 9/2009 | Fornage |
| 2009/0230782 A1 | 9/2009 | Fornage |
| 2009/0242272 A1 | 10/2009 | Little et al. |
| 2009/0243587 A1 | 10/2009 | Fornage |
| 2009/0244929 A1 | 10/2009 | Fornage |
| 2009/0244939 A1 | 10/2009 | Fornage |
| 2009/0244947 A1 | 10/2009 | Fornage |
| 2009/0296348 A1 | 12/2009 | Russell et al. |
| 2010/0085035 A1 | 4/2010 | Fornage |
| 2010/0088052 A1 | 4/2010 | Yin et al. |
| 2010/0091532 A1 | 4/2010 | Fornage |
| 2010/0106438 A1 | 4/2010 | Fornage |
| 2010/0139945 A1 | 6/2010 | Dargatz |
| 2010/0175338 A1 | 7/2010 | Garcia Cors |

(56) References Cited

U.S. PATENT DOCUMENTS

| | | | |
|---|---|---|---|
| 2010/0176771 A1 | 7/2010 | Fieldhouse et al. | |
| 2010/0181830 A1 | 7/2010 | Fornage et al. | |
| 2010/0195357 A1 | 8/2010 | Fornage et al. | |
| 2010/0214808 A1 | 8/2010 | Rodriguez | |
| 2010/0222933 A1 | 9/2010 | Smith et al. | |
| 2010/0236612 A1 | 9/2010 | Khajehoddin et al. | |
| 2010/0263704 A1 | 10/2010 | Fornage et al. | |
| 2010/0283325 A1 | 11/2010 | Marcianesi et al. | |
| 2010/0309695 A1 | 12/2010 | Fornage | |
| 2011/0012429 A1 | 1/2011 | Fornage | |
| 2011/0019444 A1 | 1/2011 | Dargatz et al. | |
| 2011/0026281 A1 | 2/2011 | Chapman et al. | |
| 2011/0026282 A1 | 2/2011 | Chapman et al. | |
| 2011/0043160 A1 | 2/2011 | Serban | |
| 2011/0049990 A1 | 3/2011 | Amaratunga et al. | |
| 2011/0051820 A1 | 3/2011 | Fornage | |
| 2011/0130889 A1 | 6/2011 | Khajehoddin et al. | |
| 2012/0134186 A1* | 5/2012 | Johnson et al. | 363/71 |
| 2013/0155735 A1* | 6/2013 | Ilic et al. | 363/71 |
| 2013/0308357 A1* | 11/2013 | Amano | 363/71 |

FOREIGN PATENT DOCUMENTS

| | | |
|---|---|---|
| CA | 2693737 A1 | 8/2010 |
| DE | 20012131 U1 | 3/2001 |
| EP | 1837985 A2 | 9/2007 |
| GB | 2419968 A | 5/2006 |
| GB | 2421847 A | 7/2006 |
| GB | 2439648 A | 1/2008 |
| GB | 2434490 B | 4/2009 |
| GB | 2454389 A | 5/2009 |
| GB | 2455753 A | 6/2009 |
| GB | 2455755 A | 6/2009 |
| NL | 1021582 C2 | 4/2004 |
| NL | 1021591 C2 | 4/2004 |
| WO | WO 2004008619 A2 | 1/2004 |
| WO | WO 2004010048 A1 | 11/2004 |
| WO | WO 2004100348 A8 | 12/2005 |
| WO | WO 2006048688 A1 | 5/2006 |
| WO | WO 2007080429 A2 | 7/2007 |
| WO | WO 2009081205 A2 | 7/2009 |
| WO | WO 2009081205 A3 | 10/2009 |
| WO | WO 2009134756 A1 | 11/2009 |

OTHER PUBLICATIONS

Kwon et al., "High-efficiency Module-integrated Photovoltaic Power Conditioning System," IET Power Electronics, doi: 10.1049/iet-pel.2008.0023, 2008.

Lohner et al., "A New Panel-integratable Inverter Concept for Grid-Connected Photovoltaic Systems," IEEE ISIE '96. vol. 2, pp. 827-831, 1996.

Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.

Martins et al., "Interconnection of a Photovoltaic Panels Array to a Single-Phase Utility Line From a Static Conversion System," Proc. IEEE Power Electronics Specialists Conf., pp. 1207-1211, 2000.

Martins et al., "Usage of the Solar Energy from the Photovoltaic Panels for the Generation of Electrical Energy," The 21st International Telecommunication Energy Conference, 6 pages, 1999.

Matsui et al., "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.

Meinhardt et al., "Miniaturised 'low profile' Module Integrated Converter for Photovoltaic Applications with Integrated Magnetic Components," IEEE APEC '99, vol. 1, pp. 305-311, 1999.

Meza et al., "Roost-Buck Inverter Variable Structure Control for Grid-Connected Photovoltaic Systems," IEEE International Symposium on Circuits and Systems, vol. 2, pp. 1318-1321, 2005.

Midya et al., "Dual Switched Mode Power Converter," 15th Annual Conference of IEEE Industrial Electronics Society, vol. 1, pp. 155-158, Mar. 1989.

Midya et al., "Sensorless Current Mode Control—An Observer-Based Technique for DC-DC Converters," IEEE Transactions on Power Electronics, vol. 16, No. 4, pp. 522-526, Jul. 2001.

Nikraz et al., "Digital Control of a Voltage Source Inverter in Photovoltaic Applications," 35th Annual IEEE Power Electronics Specialists Conference, pp. 3266-3271, 2004.

Oldenkamp et al., "AC Modules: Past, Present and Future, Workshop Installing the Solar Solution," Jan. 1998, Hatfield, UK, 6 pages.

Pajic et al., "Unity Power Factor Compensation for Burst Modulated Loads," IEEE Power Engineering Society General Meeting, vol. 2, pp. 1274-1277, 2003.

Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.

Rodriguez et al., "Analytic Solution to the Photovoltaic Maximum Power Point Problem," IEEE Transactions on Circuits and Systems, vol. 54, No. 9, pp. 2054-2060, Sep. 2007.

Rodriguez et al., "Dynamic Stability of Grid-Connected Photovoltaic Systems," Power Engineering Society General Meeting, vol. 2, pp. 2193-2199, 2004.

Rodriguez et al., "Long-Lifetime Power Inverter for Photovoltaic AC Modules." IEEE Transaction on Industrial Electronics, vol. 55, No. 7, pp. 2593-2601, Jul. 2008.

Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.

Russell et al., "SunSine300 AC Module, Annual Report Jul. 25, 1995-Dec. 31, 1996," NREL/SR-520-23432, UC Category 1280, 1997, 31 pages.

Schmidt et al., "Control of an Optimized Converter for Modular Solar Power Generation," 20th International Conference on Industrial Electronics, Control and Instrumentation, vol. 1, pp. 479-484, 1994.

Schutten et al., "Characteristics of Load Resonant Converters Operated in a High-Power Factor Mode," IEEE, Trans. Power Electronics, vol. 7, No. 2, pp. 5-16, 1991.

Sen et al., "A New DC-To-AC inverter With Dynamic Robust Performance," 1998 IEEE Region 10 International Conference on Global Connectivity in Energy, Computer, Communication and Control, vol. 2, pp. 387-390, 1998.

Shimizu et al., "Flyback-Type Single-Phase Utility Interactive Inverter with Power Pulsation Decoupling on the DC Input for an AC Photvoltaic Module System," IEEE, Trans. Power Electronics. vol. 21, No. 5, pp. 1264-1272, Sep. 2006.

Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.

Strong et al., "Development of Standardized, Low-Cost AC PV Systems—Phase I Annual Report," NREL/SR-520-23002, Jun. 1997, 18 pages.

Strong et al., "Development of Standardized, Low-Cost AC PV Systems—Final Technical Report," NREL/SR-520-26084, Feb. 1999, 27 pages.

Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.

Takafiashi et al., "Development of Long Life Three Phase Uninterruptible Power Supply Using Flywheel Energy Storage Unit," Proc. Int'l Conf. Power Electronics,. vol. 1, pp. 559-564, 1996.

Takahashi et al., "Electrolytic Capacitor-Less PWM Inverter", in Proceedings of the IPEC '90, Tokyo, Japan, pp. 131-138, Apr. 2-6, 1990.

Thomas et al., "Design and Performance of Active Power Filters," IEEE IAS Magazine, 9 pages, 1998.

Tian, "Solar-Based Single-Stage High-Efficiency Grid-Connected Inverter," Masters Thesis, University of Central Florida, Orlando, 83 pages, 2005.

(56) References Cited

OTHER PUBLICATIONS

Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.

Wada et al., "Reduction Methods of Conducted EMI Noise on Parallel Operation for AC Module Inverters," 2007 IEEE Power Electronics Specialists Conference, pp. 3016-3021, Jun. 2007.

Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.

Wu, et al., "A 1ω 3W Grid-Connection PV Power inverter with APF Based on Nonlinear Programming and FZPD Algorithm," Eighteenth Annual IEEE Applied Power Electronics Conference and Exposition, APEC '03, vol. 1, pp. 546-5552, 2033.

Wu, et al., "A 1ω 3W Grid-Connection PV Power Inverter with Partial Active Power Filter," IEEE Transactions on Aerospace and Electronic Systems, vol. 39, No. 2, pp. 635-646, Apr. 2003.

Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.

Xue et al., "Topologies of Single-Phase Inverters for Small Distributed Power Generators: An Overview," IEEE Transactions on Power Electronics, vol. 19, No. 5, pp. 1305-1314, 2004.

Ando et al., "Development of Single Phase UPS Having AC Chopper and Active Filter Ability," IEEE International Conference on Industrial Technology, 10.1109/ICIT.2006.372445, pp. 1498-1503, 2006.

Biel et al., "Sliding-Mode Control Design of a Boost-Buck Switching Converter for AC Signal Generation," vol. 51, issue 8, pp. 1539-1551, 2004.

Biel et al., "Sliding-Mode Control of a Single-Phase AC/DC/AC Converter," Proceedings of the 40th IEEE Conference on Decision and Control, vol, 1., pp. 903-907, Dec. 2001.

Bose et al., "Electrolytic Capacitor Elimination in Power Electronic System by High Frequency Filter," Conference Record of the 1991 IEEE Industry Applications Society Annual Meeting, vol. 1, pp. 869-878, 1991.

Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.

Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.

Brekken et al., "Utility-Connected Power Converter for Maximizing Power Transfer From a Photovoltaic Source While Drawing Apple-Free Current," 2002 IEEE 33rd Annual Power Electronics Specialists Conference, vol. 3, pp. 1518-1522, 2002.

Brekken, "Utility-Connected Power Converter for Maximizing Power Transfer From a Photovoltaic Source," Thesis Submitted to the Faculty of the Graduate School of the University of Minnesota, Jun. 2002, 56 pages.

Bush, "UK Solar Firm Discloses Novel Inverter Topology," ElectronicsWeekly.com, Apr. 2011, last accessed Aug. 30, 2011 at http://www.electronicsweekly.com/Articles/2011/04/26/50953/UK-solar-firrn-discloses-novel-inverter-topology.htm.

Chang et al., "The Impact of Switching Strategies on Power Ouality for Integral Cycle Controllers," IEEE Transactions on Power Delivery, vol. 18, No. 3, pp. 1073-1078, Jul. 2003.

Chisenga, "Development of a Low Power Photovoltaic Inverter for Connection to the Utility Grid," PhD Thesis, Fitzwilliarn College, Cambridge, 173 pages, 2007.

Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.

Edelmoser, "Improved 2kw Solar inverter With Wide Input Voltage Range," IEEE 10th Mediterranean Conference, MEleCon 2000, vol. 2, pp. 810-813, 2000.

Enphase Energy, "Application Note: Multi-Tenant Design Guidelines," rev. 1, 5 pages, 2008.

Enphase Energy, "Enphase Field Wiring Diagram—M190 & M210 Microinverters—240v, Single Phase," Drawing No. 144-00001, rev. 6, 1 page, 2009.

Enphase Energy, "Enphase Micro-Inverter Technical Data," Doc. No. 142-00004, rev. 2, 2 pages, 2008.

Esram et al., "Comparison of Photovoltaic Array Maximum Power Point Tracking Techniques," IEEE Transactions on Energy Conversion, vol. 22, No. 2, pp. 439-449, Jun. 2007.

Henze et al., "A Novel AC Module with High-Voltage Panels in CIS Technology," 23rd European Photovoltaic Solar Energy Conference, Valencia, Spain, ISBN 3-936336-24-8, 8 pages, Sep. 2008.

Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.

Hung et al., "Analysis and Implementation of a Delay-compensated Deadbeat Current Controller for Solar Inverters," IEEE Proceedings—Circuits, Devices and Systems, pp. 279-286, 2001.

Itoh et al., "Ripple Current Reduction of a Fuel Cell for a Single-Phase isolated Converter using a DC Active.Filter with a Center Tap," Twenty-Fourth Annual IEEE Applied Power Electronics Conference and Exposition, APEC '09, pp. 1813-1818, 2009.

Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.

Jeong et al., "An Improved Method for Anti-Islanding by Reactive Power Control," pp. 965-970, 2005.

Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.

Jung et al., "High-frequency DC Link Inverter for Grid-Connected Photovoltaic System," Conference Record of the Twenty-Ninth IEEE Photovoltaic Specialists Conference, pp. 1410-1413, 2002.

Kern, "SunSine300: Manufacture of an AC Photovoltaic Module, Final Report, Phases I & II, Jul. 25, 1995-Jun. 30, 1998," NREL/SR-520-26085, 1999, 32 pages.

Khajehoddin et al., "A Nonlinear Approach to Control Instantaneous Power for Single-phased Grid-connected Photovoitaic Systems," IEEE Enemy Conversion Congress and Exposition (ECCE), pp. 2206-2212, 2009.

Khajehoddin et al., "A Novei Topology and Control Strategy for Maximum Power Point Trackers and Multi-string Grid-connected PV Inverters," Applied Power Electronics Conference, APEC08, pp. 173-178, 2008.

Khajehoddin et al., "A Robust Power Decoupler and Maximum Power Point Tracker Topology for a Grid-Connected Photovoltaic System," IEEE Power Eiectronics Specialists Conference, PESC08, pp. 66-69, 2008.

Kim et al., "New Control Scheme for AC-DC-AC Converter Without DC Link Eiectrolytic Capactor," 24th Annual IEEE Power Electronics Specialists Conference, PESC '93 Record., pp. 300-305, 1993.

Kitano et al., "Power Sensor-less MPPT Control Scheme Utilizing Power Balance at DC Link—System Design to Ensure Stability and Response," The 27th Annual Conference of the IEEE industrial Electronics Society, vol. 2, pp. 1309-1314, 2001.

Kjaer et al., "A Novel Single-Stage Inverter for the AC-module with Reduced Low-Frequency Ripple Penetration," EPE 2003, ISBN 90-75815-07-7, 10 pages, 2003.

Kjaer et al., "A Review of Single-phase Grid-connected Inverters for Photovoltaic Modules," IEEE Trans on Power Electronics, vol. 41, No. 5, pp. 1292-1306, 2005.

(56) References Cited

OTHER PUBLICATIONS

Kjaer et al., "Design Optimization of a Single Phase Inverter for Photovoltaic Applications," IEEE 34th Annual Power Electronics Specialist Conference, PESC '03, vol. 3, pp. 1183-1190, 2003.

Kjaer et al., "Power Inverter Topologies for Photovoltaic Modules—A Review," Conf. record of the 37th Industry Applications Conference, vol. 2, pp. 782-788, 2002.

Kjaer, "Design and Control of an Inverter for Photovoltaic Applications," PhD Thesis, Aalborg University Institute of Energy Technology, 236 pages, 2005.

Kjaer, "Selection of Topologies for the PHOTOENERGY™ Project," Aalborg University Institute of Energy Technology, 37 pages, 2002.

Kotsopoulos et al., "A Predictive Control Scheme for DC Voltage and AC Current in Grid-Connected Photovoltaic Inverters with Minimum DC Link Capacitance," the 27th Annual Conference of the IEEE Industrial Electronics Society, vol. 3, pp. 1994-1999, 2001.

Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.

International Search Report and Written Opinion for International Application No. PCT/US2011/061364, dated Mar. 16, 2012, 11 pages.

International Preliminary Report on Patentability for International Application No. PCT/US2011/061364, dated Jun. 4, 2013, 10 pages.

\* cited by examiner

US 8,842,454 B2

INVERTER ARRAY WITH LOCALIZED INVERTER CONTROL

This application claims the benefit of priority under 35 U.S.C. §119 of U.S. Provisional Application Ser. No. 61/417,453 filed on Nov. 29, 2010, the entirety of which is incorporated by reference herein.

TECHNICAL FIELD

The present disclosure relates, generally, to power converters that convert DC power to AC power, and more particularly, to power converters used in photovoltaic applications.

BACKGROUND

Photovoltaic (PV) cells may generate power that can be used for purposes such as supplying power to a utility grid. However, PV cells generate direct current (DC) power and utility grids use alternating current (AC) power. Thus, the DC power generated by a PV cells must be converted to AC power in order to be used within a utility grid. Power inverters may be used to provide such conversion. It is desired to perform the DC to AC power conversion with the greatest possible efficiency. During conversion various environmental conditions may exist, such as uneven distribution of solar energy across an array of PV cells, that may interfere with performing the conversion as efficiently as possible.

SUMMARY

According to one aspect of the disclosure, an apparatus may include a plurality of power inverters. Each power inverter may receive direct current (DC) power from a respective DC power source and respectively provide AC power to an AC load. The apparatus may also include a primary controller that may generate a primary control signal based on the total AC current and the total AC voltage being delivered to the AC load by the plurality of inverters. The apparatus may also include a plurality of secondary controllers that may each receive the primary control signal and produce a respective secondary control signal based on the primary control signal. The respective secondary control signal for each of the plurality of secondary controllers may control a corresponding one or more of the plurality of inverters to provide the respective AC power.

According to another aspect of the disclosure, a method of controlling AC power delivered to an AC load may include producing the AC power with an array of inverters based on an amount of received respective DC power. The method may further include generating a first control signal in response to the AC power. The method may further include generating a plurality of second control signals in response to the first control signal. The method may further include controlling respective output AC power of each inverter of the array of inverters based on a corresponding one of the second control signals and the AC power may a combination of the respective output AC power of each inverter of the array of inverters.

According to another aspect of the disclosure, a computer-readable medium may include a plurality of instructions executable by a processor. The computer-readable medium may include instructions to direct an array of inverters to produce AC power based on an amount of power received by the inverters. The computer-readable medium may further include instructions to generate a first control signal in response to the AC power. The computer-readable medium may further include instructions to generate a plurality of second control signals in response to the first control signal. The computer-readable medium may further include instructions to control respective output AC power of each inverter of the array of inverters based on a corresponding one of the second control signals with the AC power being a combination of the respective output AC power of each inverter of the array of inverters.

DETAILED DESCRIPTION

Figure 1:
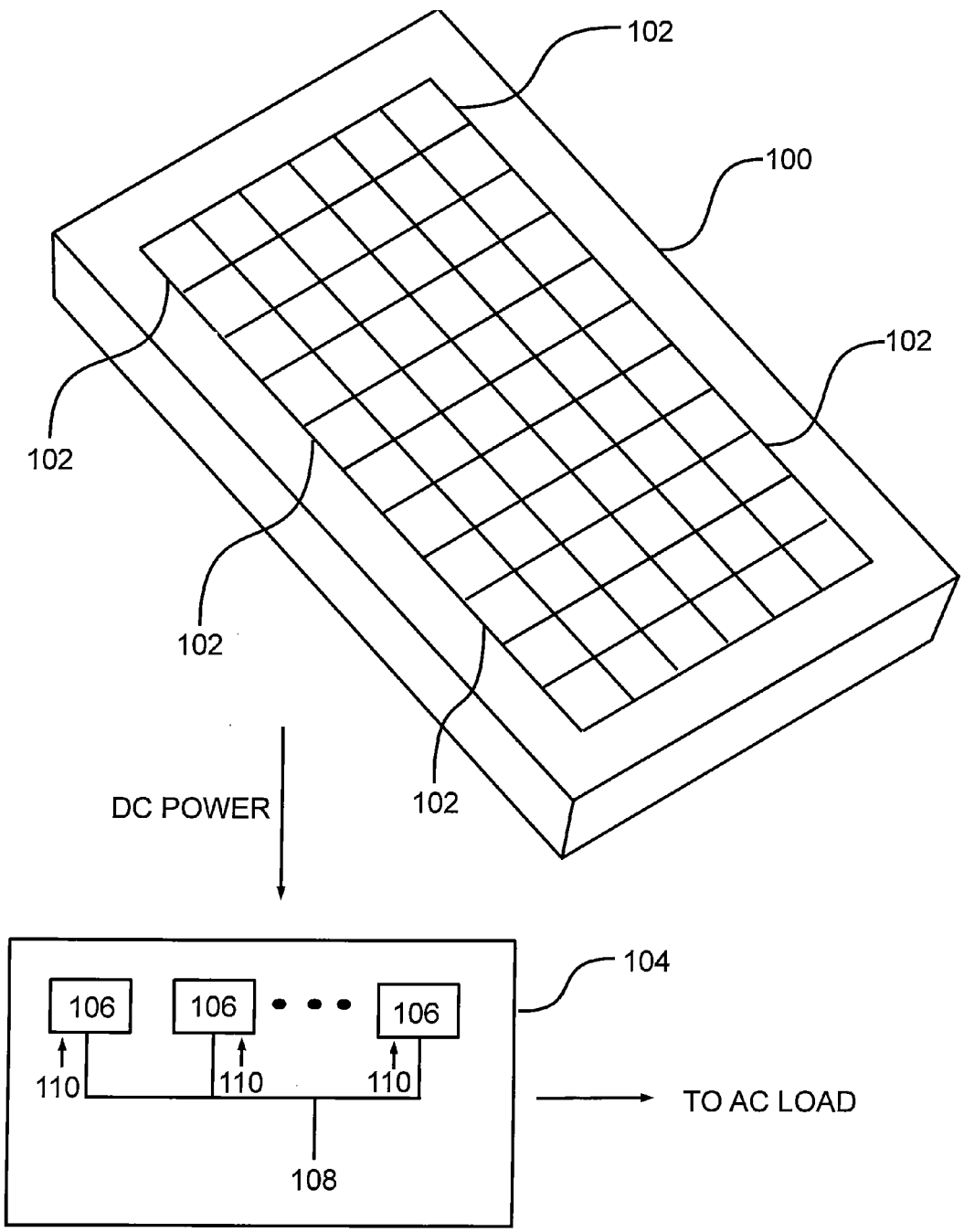
FIG. 1 is an example photovoltaic module and inverter module.

FIG. 1 is a diagram of a photovoltaic (PV) module 100 having an array of PV cells 102. The PV module 100 may be used to receive solar energy and convert the solar energy to direct current (DC) electricity. In some applications, alternating current (AC) power may be desired, such as when connected to a utility grid, for example. In such applications, an inverter module 104 may be used to convert the DC power produced by the array of PV cells 102 to AC power. In one example, the inverter module 104 may include a number of inverter sub-modules 106. Each inverter sub-module 106 may be electrically coupled to a subset of the array of PV cells 102 to convert the DC power produced by the subset of PV cells 102 to AC power. For example, each inverter sub-module 106 may be electrically coupled to single PV cell 102 in order to convert the DC power generated by the PV cell 102 to AC power. However, the inverter sub-modules 106 may be electrically coupled to a corresponding array of PV cells 102 so that the inverter sub-module 106 is responsible for converting DC power from the corresponding array of PV cells 102. The number of PV cells 102 in an array may vary in number and may be different or the same in with respect to one another.

The inverter module 104 may include a master controller 108 to provide one or more control signals 110 to each of the inverter sub-modules 106. Each of the inverter sub-modules 106 may include a local controller (see FIG. 2). Each of the inverter sub-modules 106 may use the control signals 110 to locally control the energy balance within each inverter sub-module 106.

Figure 2:
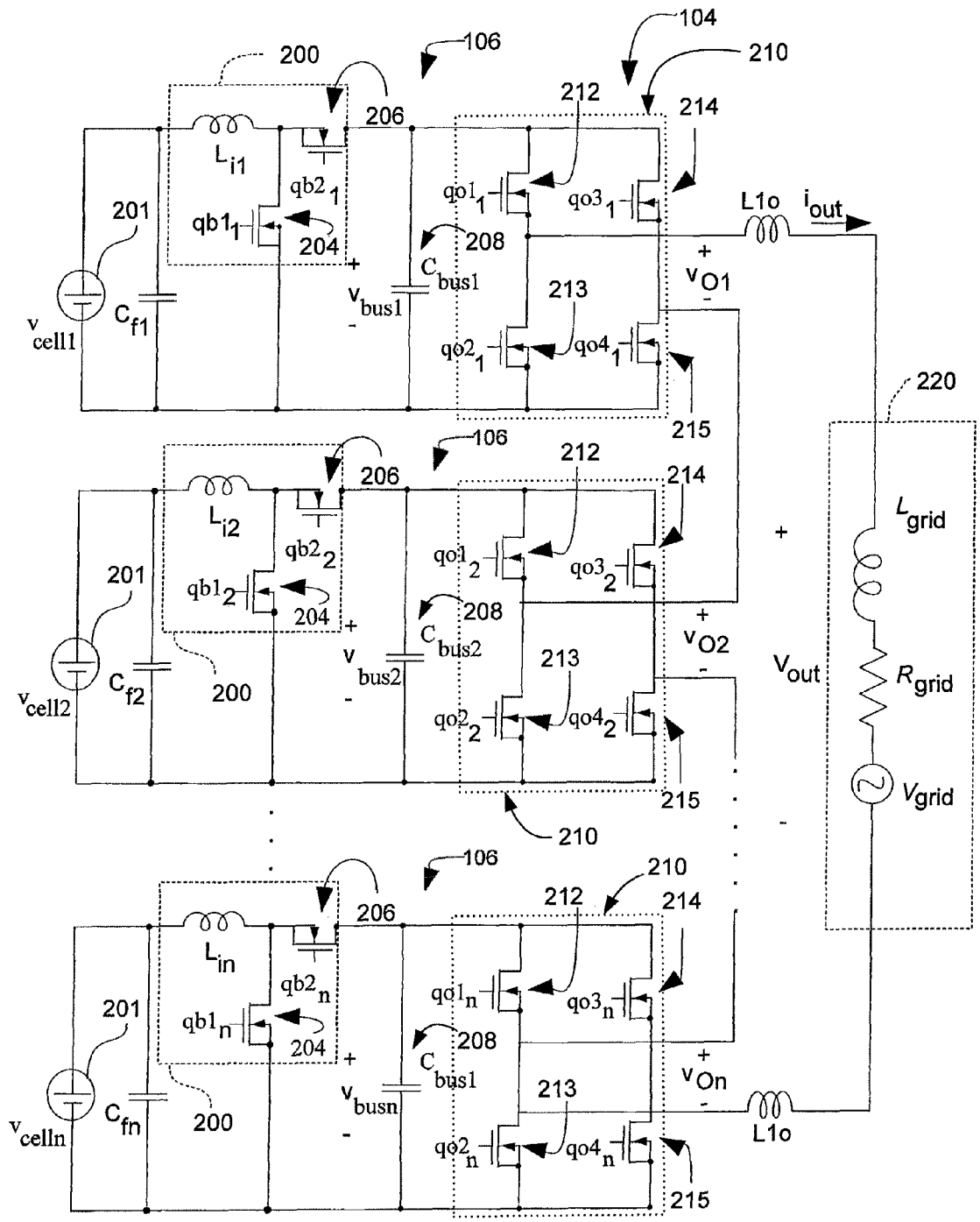
FIG. 2 is a block diagram of an example inverter module.

FIG. 2 is a circuit diagram showing an example of the PV module 100 and the inverter module 104. In the example of FIG. 2, the PV module 100 there are a number (n) of inverter sub-modules 104 and a number (n) of PV cells 102 such each inverter sub-module 106 converts DC power generated by a single PV cell 102 to AC power. In FIG. 2, components associated with each individual inverter sub-module 106 are individually designated by a subscript "x," where x is the $x^{th}$ inverter sub-module 106 in the array of (n) inverter sub-modules 106. Each inverter sub-module 106 may include a DC-DC boost converter 200 electrically coupled to a PV cell 102. Each boost converter 200 includes a converter inductance $L_b$, and switches 204 and 206. Each switch 204 and 206 may receive a control signal $qB1_x$ and $qB2_x$, respectively. The boost converter 200 boosts the DC voltage from the PV cell 102. Each PV cell 102 in FIG. 2 is represented as a DC voltage source 201 generating a DC voltage $v_{cellx}$ and is electrically coupled in parallel with a filter capacitance $C_{fx}$ of the corresponding boost converter 200. Each PV cell current $i_{cellx}$ may be provided to the boost converter 200.

Each inverter sub-module 106 also includes an energy storage component 208 electrically coupled to the corresponding boost converter 200. In the example of FIG. 2, the energy storage component 208 is a capacitance ($C_{busx}$). The energy storage component 208 may reduce voltage ripple that may be due to switching associated with switching of the boost converter or power ripple that may be associated with a single phase AC load, such as a power utility grid.

Each inverter sub-module 106 may also include an output bridge 210 that includes a set of switches 212, 213, 214, and 215. Each of the sets of switches 212 through 215 may receive a respective control signal ($qo1_x$-$qo4_x$), respectively, used to turn each respective switch 212 through 215 on and off. In one example, the switches 212 through 215 may be metal oxide semiconductor field effect transistors (MOSFETs), insulated gate bipolar transistors (IGBTs), or any other switch type suitable for power conversion switching. The switches 212 through 215 may be operated to convert the DC power stored in the energy storage component 208 to AC power to deliver to the AC load 220. In FIG. 2, the inverter sub-modules 106 are electrically coupled in series. However, in alternative examples, the inverter sub-modules 106 may be electrically coupled in other electrical configurations, such as being arranged in parallel, or a parallel and series combination.

An output inductance may be electrically coupled to the inverter sub-modules 106. In one example, the output inductance may be split into two output inductances $L1o$ and $L2o$. In FIG. 2, the first output inductance $L1o$ is electrically coupled between the first inverter sub-module 106 and the AC load 220 and the second output inductance $L2o$ is electrically coupled between the last inverter sub-module 106 and the AC load 220. In alternative examples, the total output inductance ($L1o+L2o$) may be distributed differently than that shown in FIG. 2 such as lumped into a single inductance or distributed in various manners amongst the outputs of each of the sub-inverter modules 106.

The electrically coupled inverter sub-modules 106 may provide a single output voltage $v_{out}$ and output current $i_{out}$ to the AC load 220. In the configuration of FIG. 2, the output voltage $v_{out}$ may be the sum of the sub-inverter output voltages of the sub-inverter modules 106 ($v_{o1}+v_{o2}+\ldots+v_{on}$) as experienced at the AC load 220. Due to the series configuration shown in FIG. 2, the output current $i_{out}$ will be the same flowing through each of the output bridges. In FIG. 2, the AC load 220 is represented as an output voltage source $v_{grid}$, an output load inductance $L_{grid}$, and an output resistance $R_{grid}$. However, other manners of representing the AC load 220 may be used.

Figure 3:
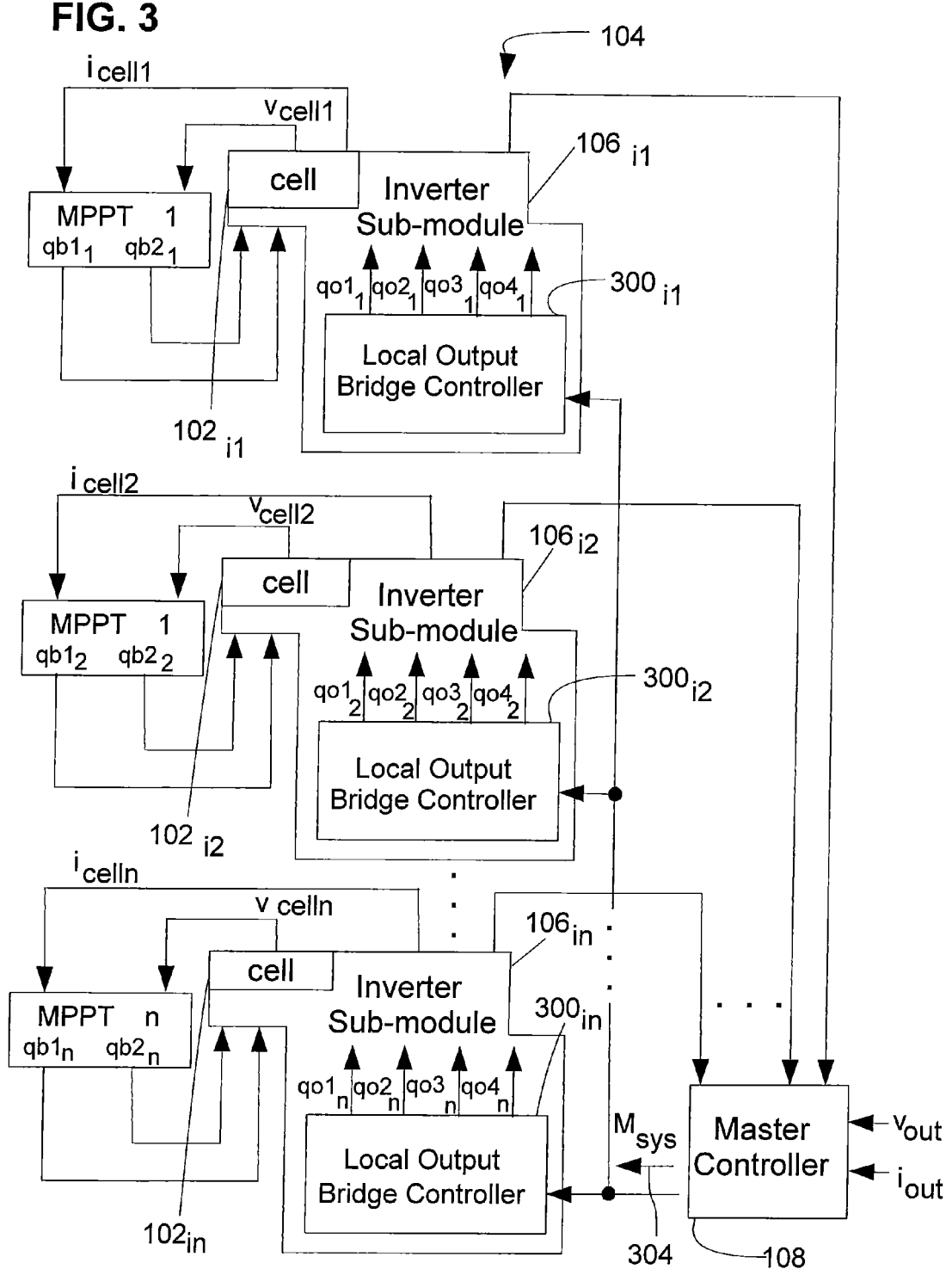
FIG. 3 is a circuit diagram of an example photovoltaic module and example inverter module

FIG. 3 is a block diagram illustrating example control features of the inverter module 104. In one example, each sub-inverter module 106 may include a local output bridge controller 300 and maximum power point tracker (MPPT) controller 302 (MPPT x). The master controller 108 may generate a master control signal ($M_{sys}$) 304 received by each local output bridge controller 300. Each local output bridge controller 300 may generate the respective switch control signals ($qo1_x$, $qo2_x$, $qo3_x$, and $qo4_x$) for each associated inverter sub-module 106 based on the control signal 304. Each local output bridge controller 300 may monitor the bus voltage $V_{busx}$ for the corresponding storage component 208 in order to increase or decrease the current to the inverter sub-module 106 allowing the bus voltage $V_{busx}$ to be adjusted.

Each MPPT controller 302 may receive the respective cell voltage $v_{cellx}$ and cell current $i_{cellx}$ and generate the boost converter switch control signals ($qB1_x$, $qB2_x$) for the associated inverter sub-module 106. The master controller 108 may receive the bus voltage $v_{busx}$ for each inverter sub-module 106, the output voltage $v_{out}$, and the output current $i_{out}$.

Figure 4:
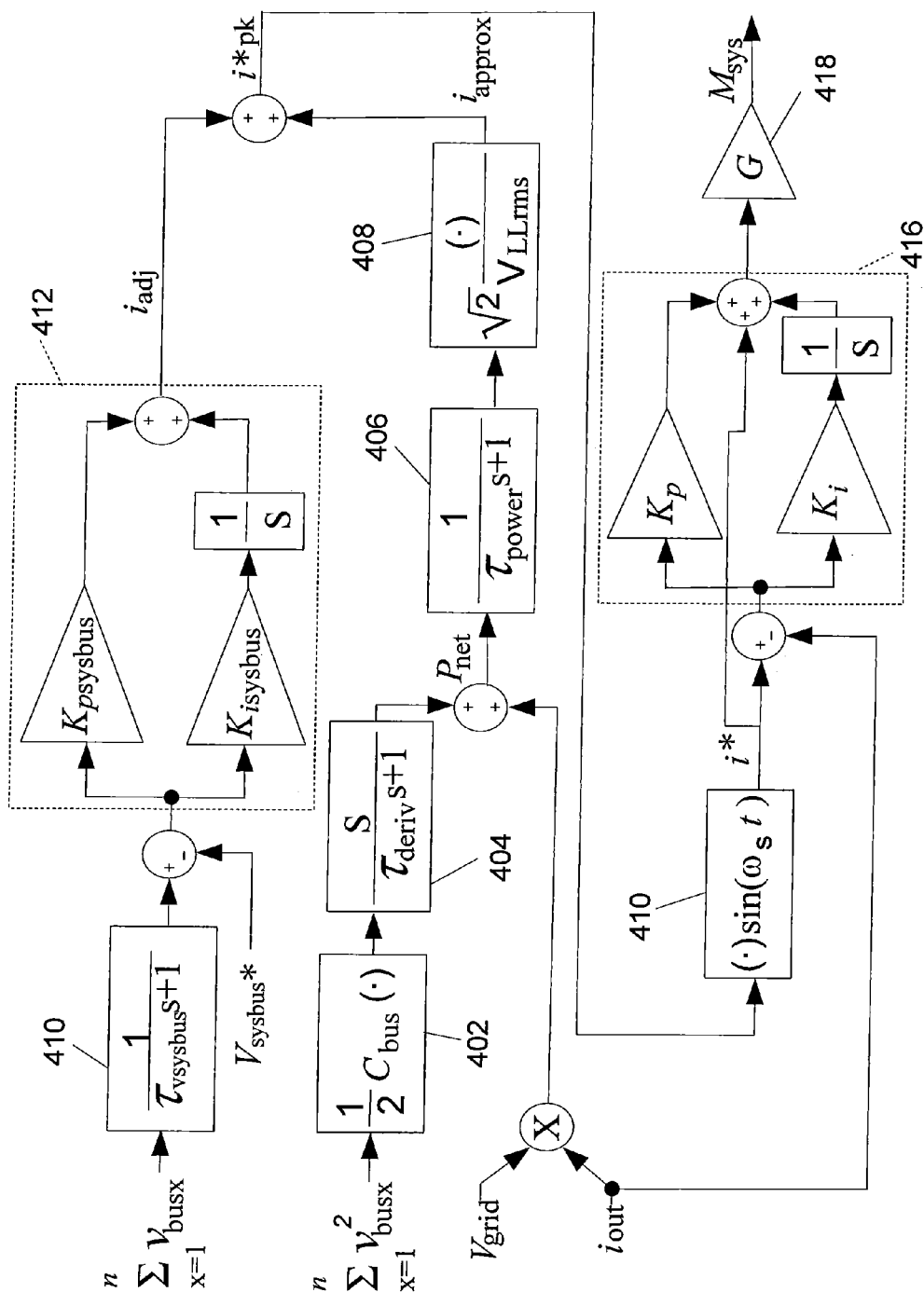
FIG. 4 is a block diagram of an example controller.

FIG. 4 is a block diagram of an example of the master controller 108. The master controller 108 may maintain a system-level energy balance. For example, in a single phase utility grid connected power inverter application, such as that shown in FIG. 1, double frequency power is to be delivered to the utility grid and the total energy in the storage component 208 for each inverter sub-module 106 must be held as constant as possible. The double frequency power may be represented by:

$$p(t)=Po-Po*\cos(2*\omega_s*t+\phi)),\qquad\text{Eqn. 1}$$

where $\omega_s$ is the frequency of an AC load.

In one example, the master controller 108 receives the DC bus voltages from the inverter sub-modules 106 represented as $V_{busx}$. The master controller 108 may generate the summed squares of the bus voltages may be used to estimate the total available power current available from the array of PV cells 102. Using energy conservation and neglecting circuit losses, the approximated power available from the array of PV cells is:

$$\sum_{x=0}^{n} i_{cellx} v_{cellx} \approx P_{net} = i_{out}v_{out} + \frac{d}{dt}\frac{1}{2}C_{bus}\sum_{x=0}^{n} v_{busx}^2 \qquad\text{Eqn. 2}$$

Due to the numerical stability of the derivative calculation in Eqn. 2, the derivative may be approximated with the transfer function of:

$$G_{deriv}(s) = \frac{s}{\tau_{deriv}s + 1} \qquad\text{Eqn. 3}$$

The master controller 108 may be configured to multiply the sum of the squared bus voltages by a factor of $\frac{1}{2}C_{bus}$ using multiplier block 402 and provide the product to a lead compensator 404 using the transfer function of Eqn. 3. The output of the lead compensator 404 may be summed with the current power being received by the AC load 220 to determine the power stored in the storage components 208 and to determine the total power generated by PV module 100 ($P_{net}$). The power $P_{net}$ may be received by a transfer function 406 and multiplied by sqrt(2)(1/$V_{LLrms}$) at the multiplier block 408 to generate the desired approximated current to be provided by the inverter module 104 represented by the approximated desired current signal $i_{approx}$.

The master controller 108 may also generate a current adjustment signal $i_{adj}$ representative of the amount the approximated desired current signal $i_{approx}$ is to be adjusted. The current adjustment signal $i_{adj}$ may be based on the sum of the bus voltages ($v_{busx}$) for each of the inverter sub-modules 106. The sum of the bus voltages may be received by a transfer function 410. The difference between the output of the transfer function 410 and a desired system voltage $V_{sysbus}*$ may be received by a proportional-integral (PI) controller 412. The PI controller 412 may compensate for any error present in the difference between the output of the transfer function 410 and the desired system voltage $V_{sysbus}*$. The output of the PI controller 412 may be the current adjustment signal $i_{adj}$.

The approximated desired current signal $i_{approx}$ and the current adjustment signal $i_{adj}$ may be combined to generate the command current peak $i_{pk}*$. The peak current command may be multiplied by $\sin(\omega_s t)$ ($\omega_s$ is the desired output frequency of the inverter sub-module 106) at multiplier block 414 to generate the current command signal i* representative of the desired current to be provided to the AC load 220. The current command signal i* may be provided to a PI controller 416 and compared to the power provided to the AC load 220 based on the actual output voltage $v_{out}$ and the output current $i_{out}$. A gain block 418 may receive the output of the PI controller 416 with the output of the gain block 418 providing the master control signal ($M_{sys}$) 304.

The master controller 108 may be analog-based, digital-based, or some combination thereof. In digital-based implementations, the master controller 108 may include a processor and a memory device. The memory device may include one or more memories and may be non-transitory computer-readable storage media or memories, such as a cache, buffer, RAM, removable media, hard drive or other computer readable storage media. Computer readable storage media may include various types of volatile and nonvolatile storage media. Various processing techniques may be implemented by the processor such as multiprocessing, multitasking, parallel processing and the like, for example. The processor may include one or more processors.

Figure 5:
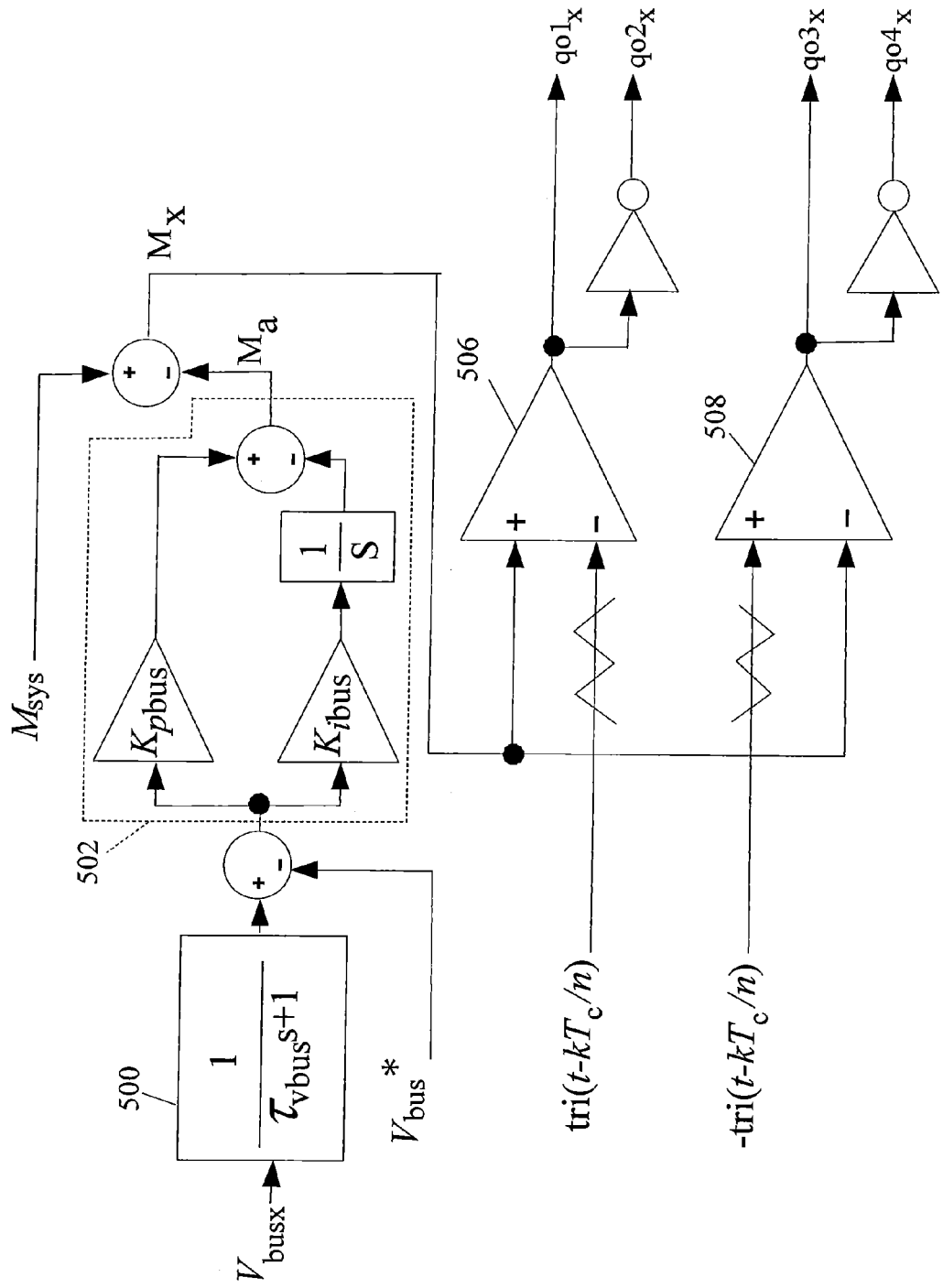
FIG. 5 is block diagram of another example controller.

FIG. 5 is a block diagram of an example configuration of the local output bridge controller 300. The local output bridge controller 300 may contribute to maintaining local energy balance by adjusting the master control signal $M_{sys}$ such that the voltage across the corresponding energy component 208 remains within a desired range. The effect of the local output bridge controller 300 is to shift the switching frequency of the output bridge switches $qo1_x$-$qo4_x$ and increase the local bus voltage ripple in inverter sub-modules 106 having shaded corresponding PV cells. Each local output bridge controller 300 may receive the corresponding energy storage component voltage ($v_{busx}$) that may be received by a transfer function 500. The transfer function 500 represents a low pass filter to remove the double frequency power ripple from the bus voltage measurement. The difference between the output of the transfer function 500 and the desired energy storage component voltage $V_{bus}*$ may be generated and supplied to a PI controller 502 to reduce any error in the difference. The output of the PI controller 502 provides an adjustment signal $M_a$ that represents the desired amount by which the master control signal 304 is to be shifted to generate the local control signal M.

The local control signal $M_x$ may be compared to a pair of triangular carrier waveforms (tri( ) and –tri( )) generated by the master controller 108 (not shown). Each pair of triangular carrier waveforms for each sub-inverter 106 may be phase shifted by a unique multiple of $T_c/n$, where $T_c$ is the period of the carrier waveform. In alternative examples, sawtooth carrier waveforms may also be used. A first comparator 506 and a second comparator 508 may be used to compare each one of the triangle carrier waveform pairs with the local control signal $M_x$. The output of the first comparator 506 may be used to generate the local control signals $qo1_x$ and $qo2_x$. The output of the second comparator 508 may be used to generate the local control signals $qo3_x$ and $qo4_x$. The control signals $qo1_x$ through $qo4_x$ may be pulse width modulated (PWM) signals. Other manners of generating PWM signals may be used such as through timers.

Figure 6:
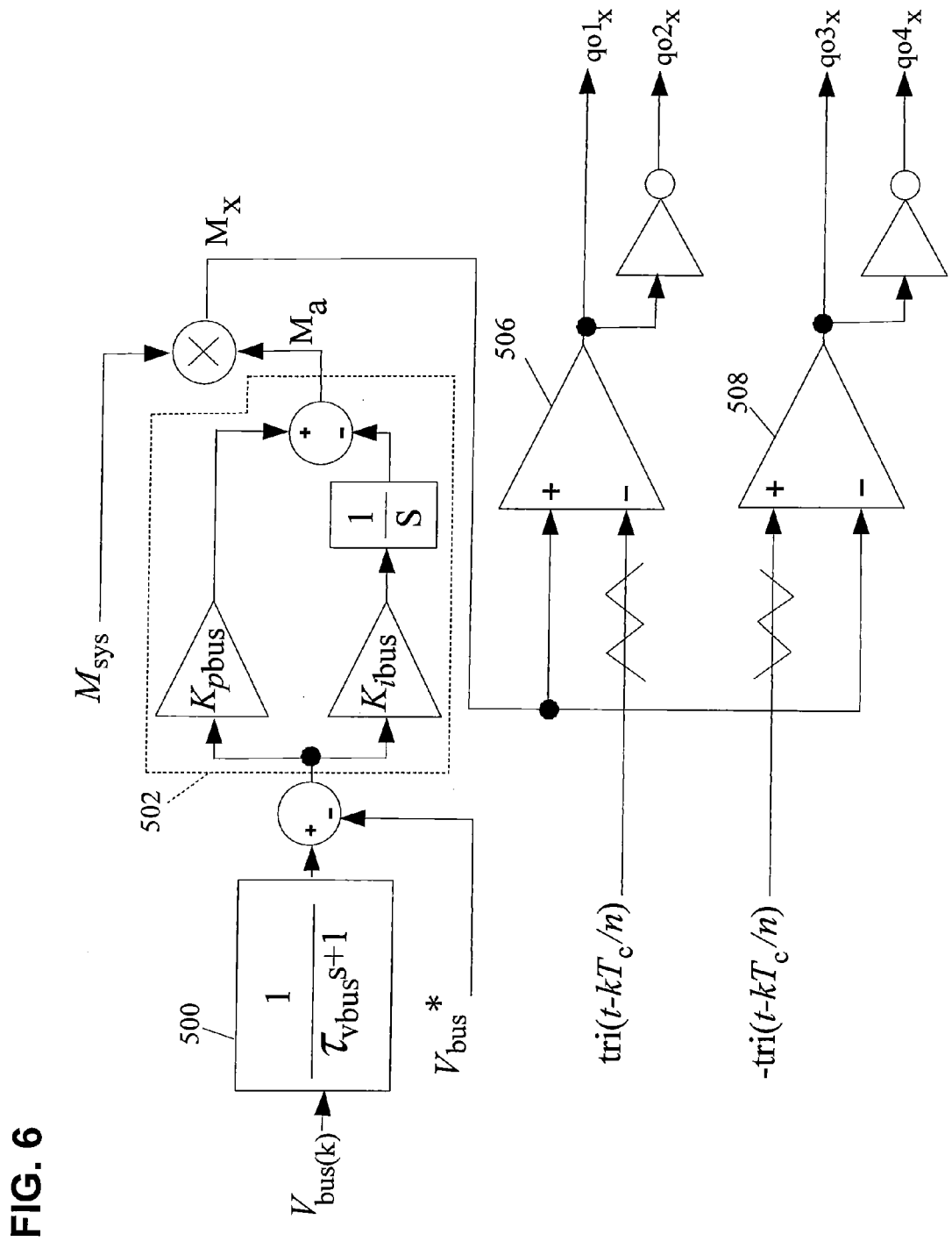
FIG. 6 is block diagram of another example controller.

FIG. 6 is a block diagram of an alternative example configuration of the local output bridge controller 300. In FIG. 6, the local control signal $M_x$ is used to scale the master control signal $M_{sys}$. The examples of the local output bridge controller 300 shown in FIGS. 5 and 6 may be analog-based, digital-based, or a combination thereof. The local output bridge controller 300 may include a processor and memory, device similar to that of the master controller 108. In digital-based applications, the master controller 108 may implement the function of the waveform carriers and comparators 506 and 508 through timers.

Figure 7:
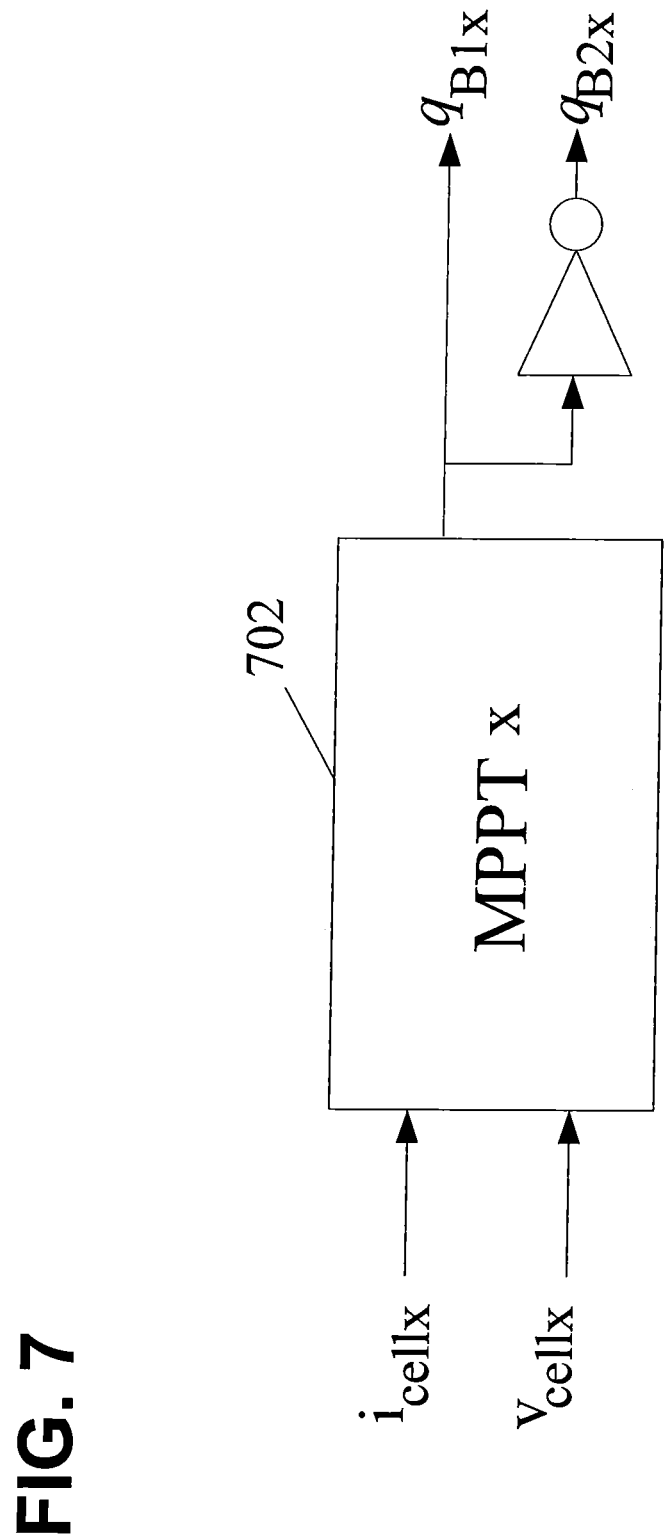
FIG. 7 is an example maximum power point tracking controller.

FIG. 7 is a block diagram of an example MPPT controller 700 that may be implemented by each sub-inverter 106 in order to generate the control signals $qB1_x$ and $qB2_x$ for each corresponding boost converter 200. The MPPT controller 700 may implement various MPPT algorithms such as perturb and observe, incremental conductance, ripple correlation, control, or any other suitable MPPT algorithm. Each MPPT controller 700 may, include a processor and memory device as previously discussed allowing the selected algorithm to be stored on the memory device and executed by the processor.

FIGS. 8-12 show simulation waveforms of performance results generated by inverter module 104. In FIGS. 8-12, the following parameters in Table 1 are used for the various elements and variables of the inverter module 104.

TABLE 1

| | | | |
|---|---|---|---|
| $L_{out}$ = 1 mH | $L_{grid}$ = 50 mH | $P_{rated}$ = 250 mW | $V_{grid}$ = 240*sqrt(2)sin(2π60t) |
| $C_{bus}$ = 1 mF | $R_{grid}$ = 1 mΩ | n = 72 | |
| | | Master Controller Parameters | |
| $K_{psysbus}$ = 0.00375 | $K_{isysbus}$ = 0.1 | $\tau_{vsysbus}$ = 1/(2 π10) s | $\tau_{power}$ = 1/(2 π60) s $V_{sysbus}*$ = 400 V |
| $K_p$ = 10/22.1 | $K_f$ = $10^6$/(22.1*8.2) | $\tau_{deriv}$ = 1/(2 π$10^5$) s | $V_{LLrms}$ = 240 V |
| G = $V_{LLrms}$/(sqrt(2)*$P_{rated}$) | | | |
| | | Local Controller—Modulation Shifting | |
| $\tau_{vbus}$ = 1/(2 π5) s | $K_{pbus}$ = 150$K_{psysbus}$ | $V_{bus}*$ = 400/n V | $K_{ibus}$ = $K_{isysbus}$  $T_c$ = 1/480 s |
| | | Local Controller Parameters—Modulation Scaling | |
| $\tau_{vbus}$ = 1/(2 π5) s | $K_{pbus}$ = 200$K_{psysbus}$ | $V_{bus}*$ = 400/n V | $K_{ibus}$ = 10$K_{isysbus}$  $T_c$ = 1/480 s |

Figure 8:
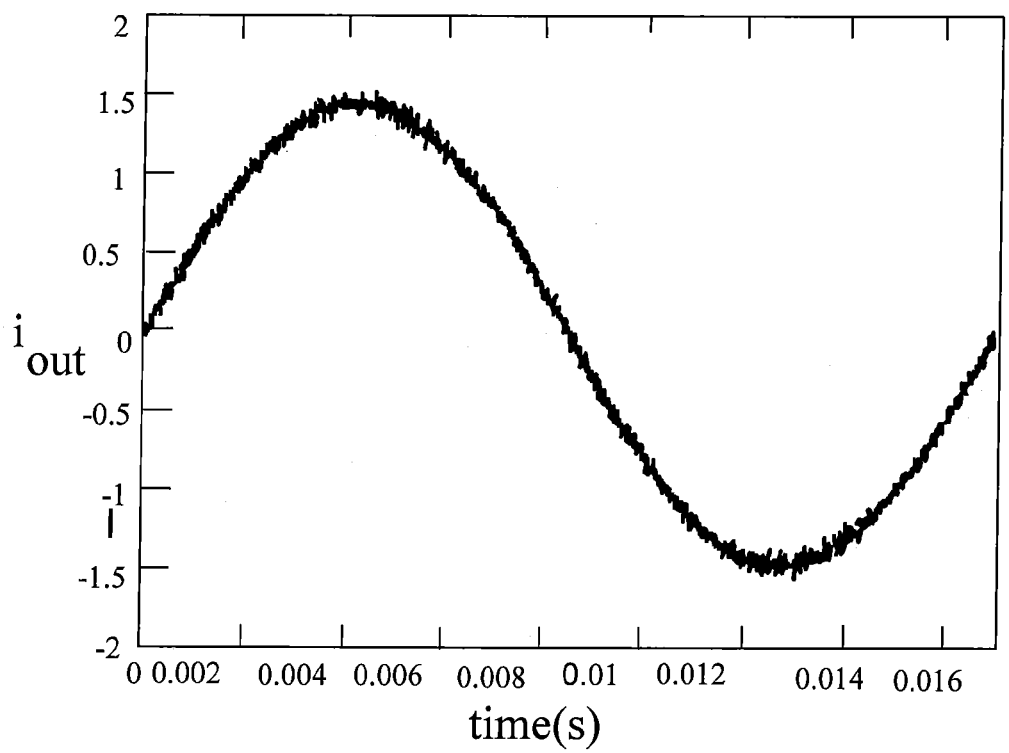
FIG. 8 is an example waveform of output current of an example inverter module over time.
Figure 9:
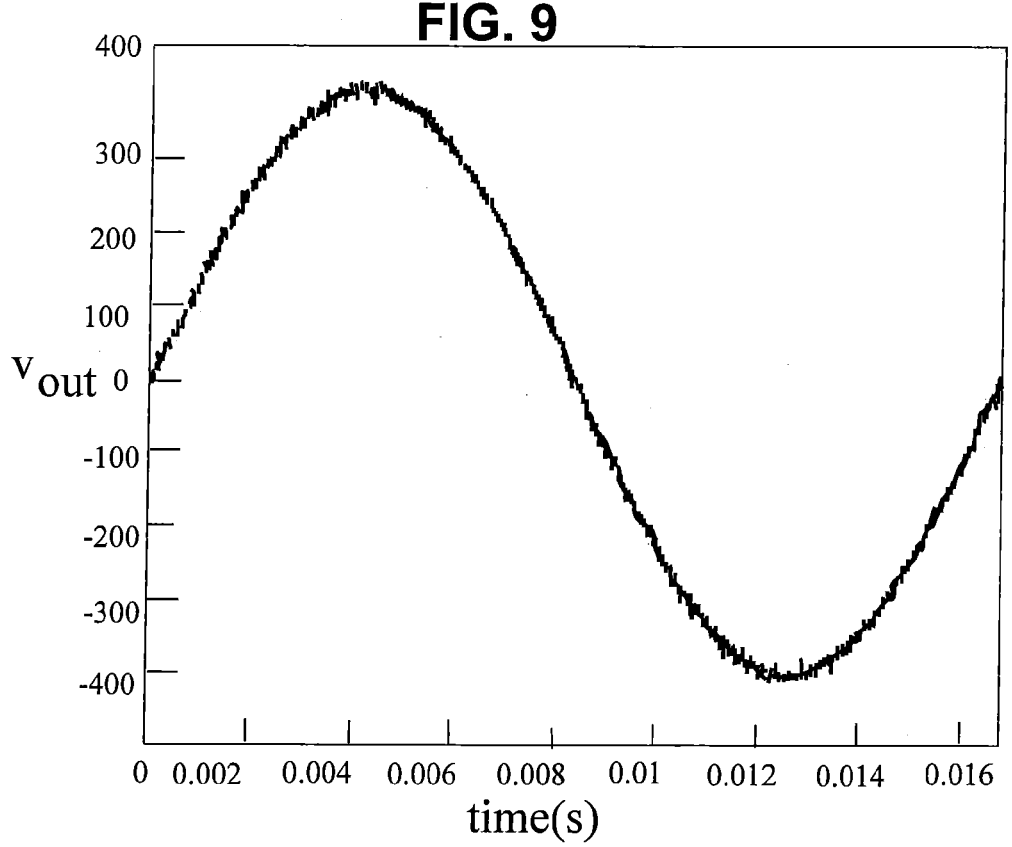
FIG. 9 is an example waveform of output voltage of an example inverter module over time.
Figure 10:
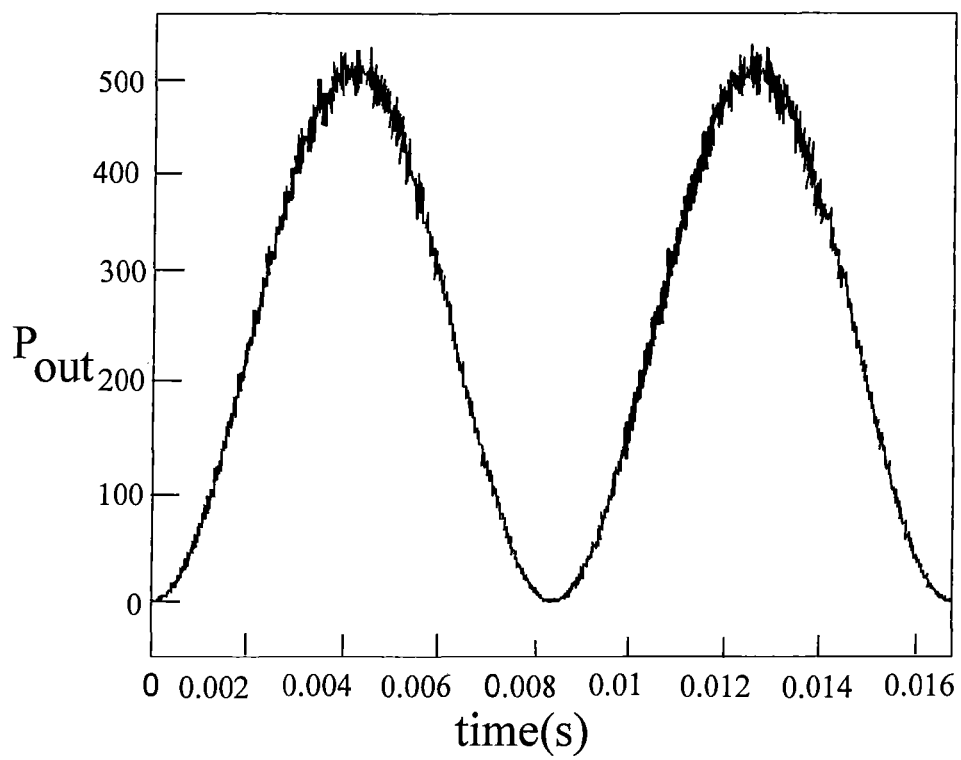
FIG. 10 is an example waveform of output power of an example inverter module over time.

FIG. 8 is a plot of the output current $i_{out}$ of the inverter module 104 versus time when having 72 PV cells 102 in the PV module 100 and a corresponding sub-inverter 106 for each PV cell 102. In FIG. 8, the total harmonic distortion of the output current is 2.8%. FIG. 9 is a plot of the voltage across 72 series-connected sub-inverters 106 receiving DC power from the PV cells 102 versus time. FIG. 10 is a plot of the power ($P_{out}$) delivered to the AC grid 220 by the PV module 100 having 72 sub-inverters 106.

Figure 11:
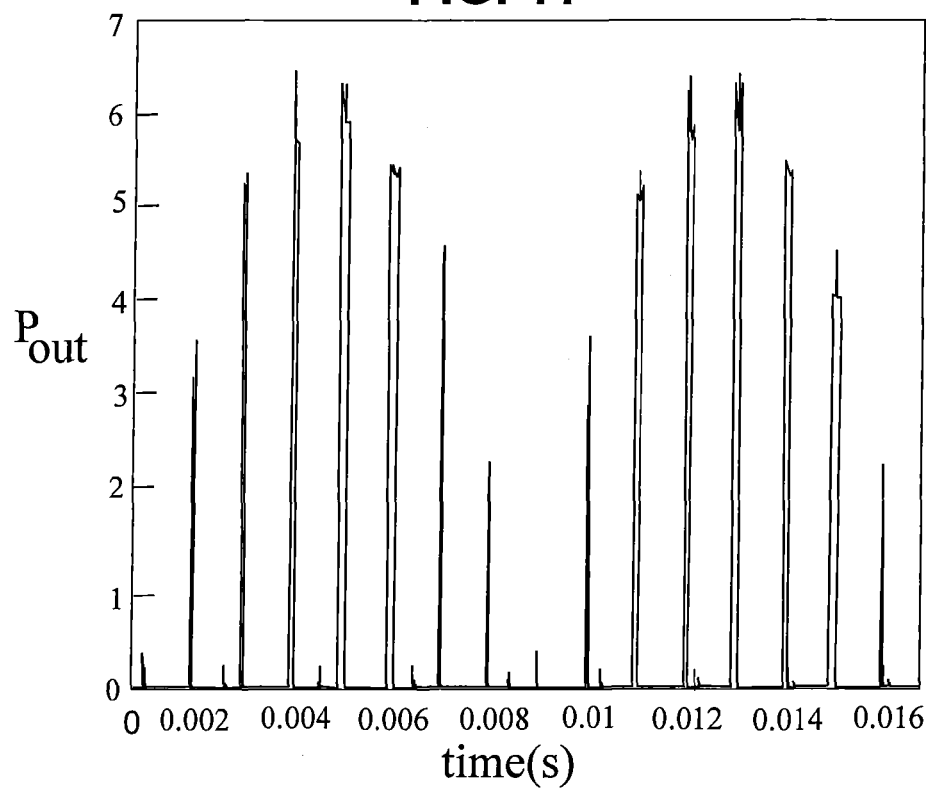
FIG. 11 is an example waveform of power output of an example inverter sub-module over time.

FIG. 11 is an example simulation waveform of the power output ($P_{out}$) of an inverter sub-module 106 having a corresponding shaded PV cell 102. In the example of FIG. 11, 10 PV cells of the 72 PV cells 102 are shaded. The example of FIG. 11 is based on a local output bridge controller 300 having the controller configuration of FIG. 5. As shown in FIG. 11, power remains positive for the sub-inverter 106 having a shaded cell, but delivers the power in brief bursts.

Figure 12:
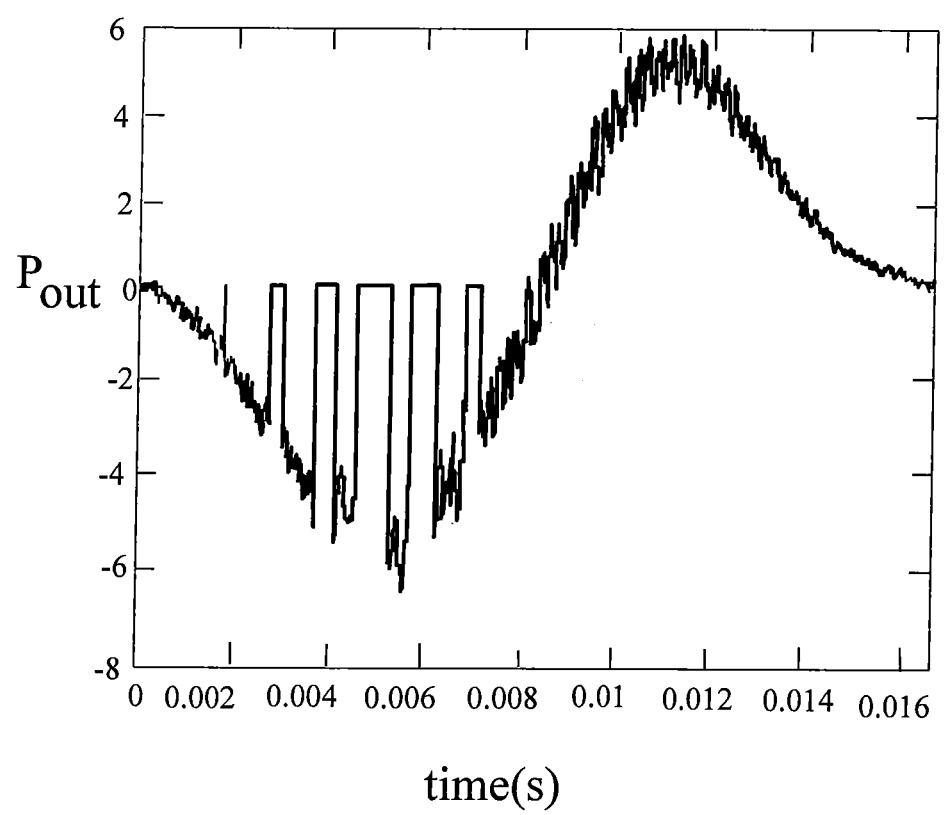
FIG. 12 is another example waveform of power output of an example inverter sub-module over time.

FIG. 12 is an example simulation waveform of the power output ($P_{out}$) of an inverter sub-module 106 having a corresponding shaded PV cell 102. In the example of FIG. 12, 10 PV cells of the 72 PV cells 102 are shaded. The example of FIG. 12 is based on a local output bridge controller 300 having the controller configuration of FIG. 6.

Figure 13:
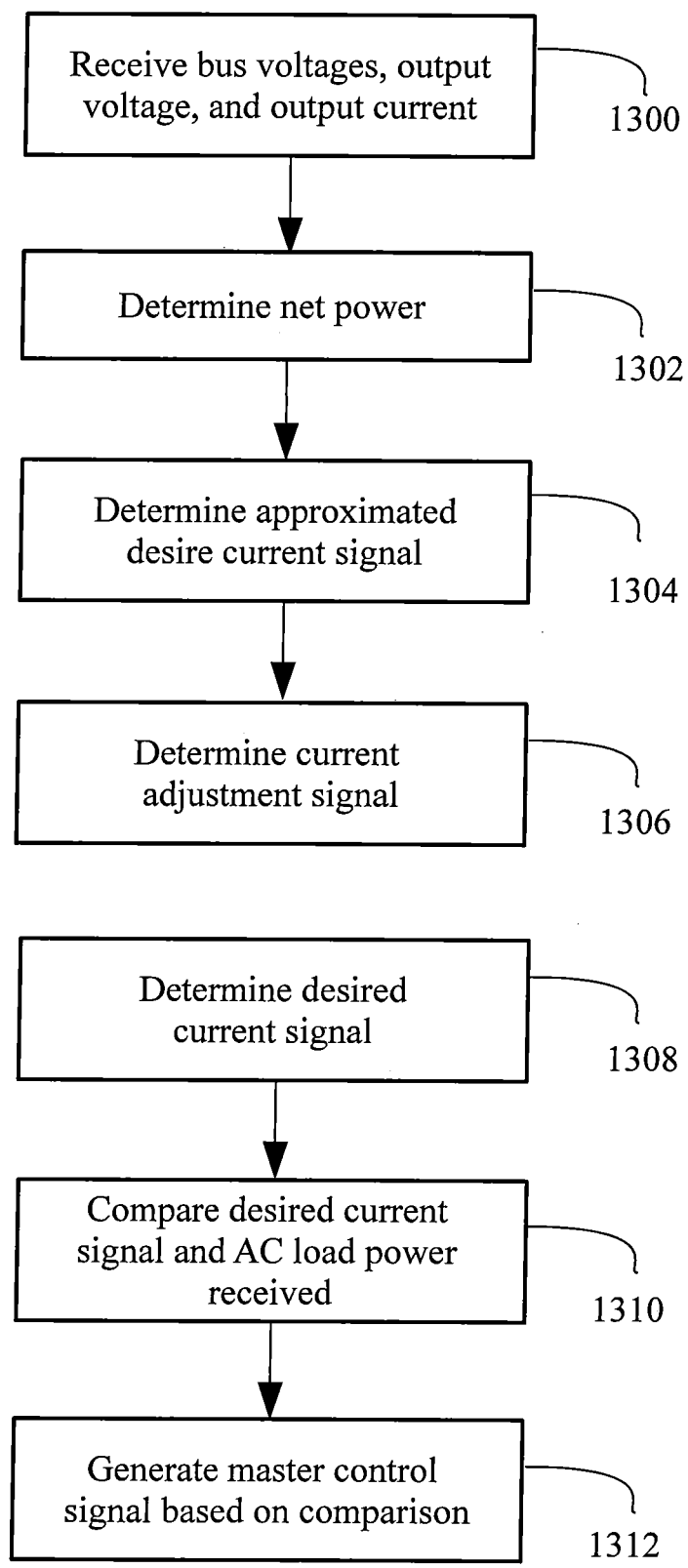
FIG. 13 is an example operational flow diagram of a controller of an inverter module.

FIG. 13 is an example operational flow diagram of the master controller 108. The inverter module 104 may receive the bus voltages ($v_{bus}$) of each inverter sub-module 106, the output voltage ($v_{grid}$), and the output current ($i_{grid}$) (1300). The net power $P_{net}$ of the combined inverter sub-modules 106 may be determined based on the sum of the squared bus voltages (1302). The approximated desired current signal $i_{approx}$ may be determined based on the net power $P_{net}$ (1304). A current adjustment signal may be determined based on the sum of the bus voltages ($v_{bus}$) (1306). A desired current signal i* may be determined based on the approximated desired current signal $i_{approx}$ and the current adjustment signal $i_{adj}$ (1308). The desired current signal i* and the actual load power being delivered by the inverter module 104 to the AC load 220 may be compared (1310). The master control signal 304 may be generated based on the comparison (1312).

Figure 14:
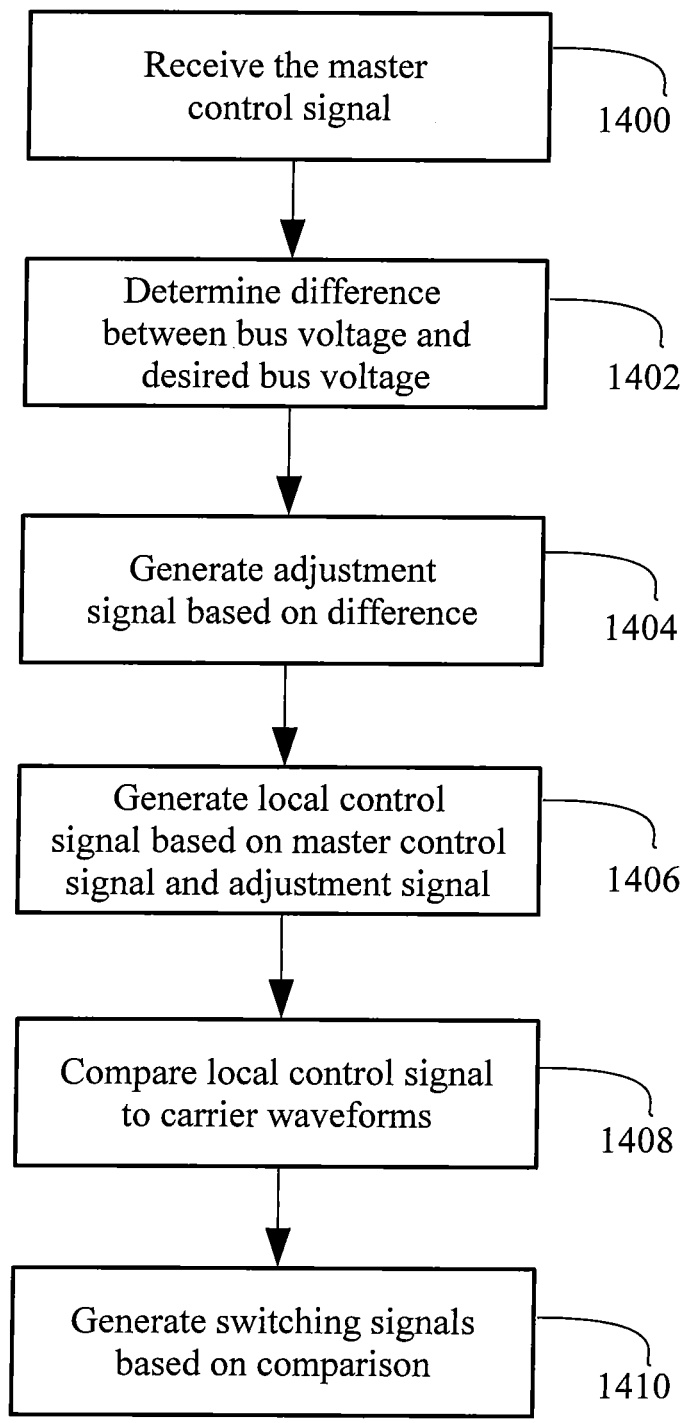
FIG. 14 is an example operational flow diagram of a controller of a sub-inverter module controller.

FIG. 14 is an example operational flow diagram of the local output bridge controller 300. The local output bridge controller configurations of FIG. 5 or 6 may be used, as well as other alternative configurations. The local output bridge controller 300 may receive the master control signal $M_{sys}$ and the corresponding bus voltage ($v_{busx}$) (1400). The difference between the bus voltage and the desired bus voltage ($V_{bus}$*) may be determined (1402). The difference between the bus voltage and the desired bus voltage may be used to generate an adjustment signal (1404). In the example of FIGS. 5 and 6, a PI controller 502 may be used to reduce the error in the adjustment signal $M_a$. The local control signal $M_x$ may be generated based on the adjustment signal $M_a$ and the master control signal $M_{sys}$ (1406). The local control signal $M_x$ may be compared to carrier waveforms (1408) to generate the local control signals $qo1_x$, $qo2_x$, $qo3_x$, and $qo4_x$ (1410).

There is a plurality of advantages of the present disclosure arising from the various features of the apparatuses, circuits, and methods described herein. It will be noted that alternative examples of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present disclosure.

We claim:

1. An apparatus to deliver alternating current (AC) power, the apparatus comprising:
a plurality of inverters configured to receive direct current (DC) power from a respective DC power source and respectively provide AC power to an AC load;
a primary controller configured to generate a primary control signal based on total AC current and total AC voltage being delivered to the AC load by the plurality of inverters; and
a plurality of secondary controllers configured to each receive the primary control signal and produce a respective secondary control signal based on the primary control signal, wherein the respective secondary control signal for each of the plurality of secondary controllers controls a corresponding one of the plurality of inverters to provide the respective AC power.

2. The apparatus of claim 1, wherein each of the inverters is configured to generate a respective first voltage based on DC power received from the respective DC power source, and wherein each of the inverters is configured to generate a respective output voltage to the AC load based on the respective first voltage, wherein each respective secondary control signal is based on the respective first voltage of the corresponding one of the inverters.

3. The apparatus of claim 2, wherein each of the secondary controllers is configured to generate a respective scaling factor based on the respective first voltage, and wherein each of the secondary controllers is configured to scale the primary control signal by the respective scaling factor to generate the respective secondary control signal of the corresponding one of the inverters.

4. The apparatus of claim 2, wherein each of the secondary controllers is configured to generate a respective shift factor based on the respective first voltage, and wherein each of the secondary controllers is configured to shift the primary control signal by the respective shift factor to generate the respective secondary control signal of the corresponding one of the inverters.

5. The apparatus of claim 2, wherein each of the inverters comprises a respective set of switches configured to convert the respective first voltage to the respective output voltage, and wherein each set of respective switches is operated at a respective switching frequency based on the respective secondary control signal.

6. The apparatus of claim 5, wherein each respective set of switches is configured to receive a respective set of control signals, wherein each respective set of control signals is based on a comparison of the respective secondary control signal and a reference signal.

7. The apparatus of claim 5, wherein the apparatus further comprises a plurality of respective maximum power point trackers, wherein each maximum power point tracker is configured to generate a respective set of control signals based on a DC current and DC voltage produced by a respective number of photovoltaic cells, wherein each respective set of control signals is used by each inverter to produce the respective first voltage.

8. The apparatus of claim 2, wherein the primary controller is further configured to generate a primary control signal based on the respective first voltage of each of the inverters.

9. The apparatus of claim 2, wherein each respective first voltage is based on the respective DC power received by a corresponding inverter from a respective number of photovoltaic cells of an array of photovoltaic cells.

10. A method of controlling alternating current (AC) power delivered to an AC load, the method comprising:

producing the AC power with an array of inverters based on an amount of received respective DC power;
generating a first control signal in response to the AC power;
generating a plurality of second control signals in response to the first control signal; and
controlling respective output AC power of each inverter of the array of inverters based on a corresponding one of the second control signals, wherein the AC power is a combination of the respective output AC power of each inverter of the array of inverters.

11. The method of claim 10, further comprising generating a respective DC voltage with each inverter of the array of inverters based on the amount of received respective DC power, wherein each of the plurality of second control signals is based on the respective DC voltage.

12. The method of claim 11, wherein generating a plurality of second control signals further comprises:
generating a plurality of respective scaling factors for each inverter of the array of inverters based on the respective DC voltage; and
scaling the first control signal by each respective scaling factor to generate each of the plurality of second control signals.

13. The method of claim 11, wherein generating a plurality of second control signals further comprises:
generating a plurality of respective shift factors for each inverter of the array of inverters based on the respective DC voltage; and
shifting the first control signal by each respective shift factor to generate each of the plurality of second controls.

14. The method of claim 11, wherein generating the first control signal comprises generating the first control signal based on the respective DC voltage of each of the inverters.

15. The method of claim 10, wherein producing the AC power with the array of inverters based on the amount of received respective DC power comprises producing the AC power with an array of inverters based on an amount of DC power received from a respective array of photovoltaic cells.

16. The method of claim 10, wherein generating the first control signal comprises generating the first control signal primary controller is further configured to generate a primary control signal based on the respective first voltage of each of the inverters.

17. A computer-readable medium comprising a plurality of instructions executable by a processor, the computer-readable medium comprising:
instructions to direct an array of inverters to generate AC power based on an amount of received respective DC power;
instructions to generate a first control signal in response to the AC power;
instructions to generate a plurality of second control signals in response to the first control signal; and
instructions to control respective output AC power of each inverter of the array of inverters based on a corresponding one of the second control signals, wherein the AC power is a combination of the respective output AC power of each inverter of the array of inverters.

18. The computer-readable medium of claim 17, further comprising instructions to generate a respective DC voltage with each inverter of the array of inverters based on the amount of received respective DC power, wherein each of the plurality of second control signals is based on the respective DC voltage.

19. The computer-readable medium of claim 18, wherein the instructions to generate a plurality of second control signals further comprise:
instructions to generate a plurality of respective scaling factors for each inverter of the array of inverters based on the respective DC voltage; and
instructions to scale the first control signal by each respective scaling factor to generate each of the plurality of second control signals.

20. The computer-readable medium of claim 18, wherein the instructions to generate a plurality of second control signals further comprises:
instructions to generate a plurality of respective shift factors for each inverter of the array of inverters based on the respective DC voltage; and
instructions to shift the first control signal by each respective shift factor to generate each of the plurality of second control signals.

* * * * *

UNITED STATES PATENT AND TRADEMARK OFFICE
CERTIFICATE OF CORRECTION

| | | |
|---|---|---|
| PATENT NO. | : 8,842,454 B2 | Page 1 of 1 |
| APPLICATION NO. | : 13/030118 | |
| DATED | : September 23, 2014 | |
| INVENTOR(S) | : Brian Johnson et al. | |

It is certified that error appears in the above-identified patent and that said Letters Patent is hereby corrected as shown below:

In the Claims

In claim 16, at col. 10, lines 1-2, please replace "primary controller is further configured to generate a primary control signal based on the respective first" with --based on a respective DC--.

Signed and Sealed this

Twenty-second Day of September, 2015

Michelle K. Lee
*Director of the United States Patent and Trademark Office*